US007739656B2

(12) United States Patent  
Beisiegel et al.

(10) Patent No.: US 7,739,656 B2
(45) Date of Patent: Jun. 15, 2010

(54) GENERATING ASYNCHRONOUS INTERFACES AND METHODS FROM SYNCHRONOUS INTERFACES AND METHODS

(75) Inventors: Michael Beisiegel, Poughkeepsie, NY (US); Jean-Sebastien Michel Delfino, San Carlos, CA (US); Martin Paul Nally, Laguna Beach, CA (US); Peter David Niblett, Whitchurch (GB); David John Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 1393 days.

(21) Appl. No.: 11/015,306

(22) Filed: Dec. 15, 2004

(65) Prior Publication Data

US 2006/0126657 A1   Jun. 15, 2006

(51) Int. Cl.
*G06F 9/44* (2006.01)
*G06F 9/45* (2006.01)
(52) U.S. Cl. .................. 717/106; 717/107; 717/108
(58) Field of Classification Search ......... 717/105–110, 717/136, 148–149
See application file for complete search history.

(56) References Cited

U.S. PATENT DOCUMENTS

| 5,339,430 A | 8/1994 | Lundin et al. |
| 5,956,509 A | 9/1999 | Kevner |
| 5,960,421 A | 9/1999 | Cline et al. |
| 6,081,812 A * | 6/2000 | Boggs et al. ............... 707/202 |
| 6,195,685 B1 | 2/2001 | Mukherjee et al. |
| 6,212,575 B1 | 4/2001 | Cleron et al. |
| 6,223,217 B1 | 4/2001 | Pettus |
| 6,256,771 B1 | 7/2001 | O'Neil et al. |
| 6,289,390 B1 | 9/2001 | Kavner |
| 6,330,710 B1 | 12/2001 | O'Neil et al. |
| 6,425,121 B1 * | 7/2002 | Phillips ..................... 717/109 |
| 6,430,607 B1 | 8/2002 | Kavner |
| 6,438,744 B2 | 8/2002 | Toutonghi et al. |
| 6,446,064 B1 | 9/2002 | Livowsky |
| 6,448,981 B1 | 9/2002 | Kaczmarski |
| 6,493,868 B1 * | 12/2002 | DaSilva et al. ............. 717/105 |

(Continued)

FOREIGN PATENT DOCUMENTS

| EP | 1130510 A2 | 5/2001 |
| WO | 03069464 A2 | 8/2003 |

OTHER PUBLICATIONS

D'silva et al, "Synchronous protocol automata: a framework for modelling and verification of SoC Communication architecture", IEEE Date, pp. 1-6, 2004.*

(Continued)

*Primary Examiner*—Anil Khatri
(74) *Attorney, Agent, or Firm*—David Victor; Konrad Raynes & Victor LLP (57) ABSTRACT

Provided are a method, system, and program for generating asynchronous interfaces and methods from synchronous interfaces and methods receiving a synchronous interface to a target component having a synchronous method used by a client component to synchronously invoke the target component. An asynchronous interface is generated for the synchronous interface of the target component. An asynchronous method is generated for the generated asynchronous interface having arguments to invoke the target component, wherein the client calls the generated asynchronous method to cause an asynchronous execution of the synchronous method.

31 Claims, 6 Drawing Sheets

U.S. PATENT DOCUMENTS

| | | | |
|---|---|---|---|
| 6,609,158 B1 | 8/2003 | Nevarez et al. | |
| 6,643,652 B2 | 11/2003 | Helgeson et al. | |
| 6,684,385 B1* | 1/2004 | Bailey et al. | 717/109 |
| 6,691,301 B2* | 2/2004 | Bowen | 717/114 |
| 6,691,302 B1 | 2/2004 | Skrzynski et al. | |
| 6,697,836 B1 | 2/2004 | Kawano et al. | |
| 6,697,879 B1* | 2/2004 | Tufty et al. | 719/316 |
| 6,701,513 B1* | 3/2004 | Bailey | 717/109 |
| 6,795,739 B2* | 9/2004 | Graf et al. | 700/86 |
| 6,804,818 B1* | 10/2004 | Codella et al. | 719/315 |
| 6,873,695 B2 | 3/2005 | Celi, Jr. et al. | |
| 6,920,494 B2* | 7/2005 | Heitman et al. | 709/223 |
| 6,934,931 B2* | 8/2005 | Plumer et al. | 717/104 |
| 7,007,063 B2 | 2/2006 | Creamer et al. | |
| 7,072,957 B2 | 7/2006 | Creamer et al. | |
| 7,159,224 B2 | 1/2007 | Sharma et al. | |
| 7,171,673 B1 | 1/2007 | Steinman et al. | |
| 7,240,324 B2* | 7/2007 | Casati et al. | 717/103 |
| 7,246,358 B2 | 7/2007 | Chinnici et al. | |
| 7,272,820 B2* | 9/2007 | Klianev | 717/109 |
| 7,281,252 B1 | 10/2007 | Lindquist et al. | |
| 7,290,248 B2 | 10/2007 | Sengodan | |
| 7,340,721 B1* | 3/2008 | Bailey | 717/109 |
| 7,350,184 B2* | 3/2008 | Upton | 717/100 |
| 7,356,803 B2* | 4/2008 | Bau et al. | 717/116 |
| 2002/0019843 A1 | 2/2002 | Killian et al. | |
| 2002/0026471 A1 | 2/2002 | Bent et al. | |
| 2002/0104067 A1 | 8/2002 | Green et al. | |
| 2002/0152210 A1 | 10/2002 | Johnson et al. | |
| 2003/0093551 A1 | 5/2003 | Taylor et al. | |
| 2003/0182457 A1 | 9/2003 | Brewin | |
| 2003/0191803 A1 | 10/2003 | Chinnici et al. | |
| 2003/0204645 A1 | 10/2003 | Sharma et al. | |
| 2004/0012626 A1 | 1/2004 | Brookins | |
| 2004/0015859 A1 | 1/2004 | Potter et al. | |
| 2004/0045009 A1 | 3/2004 | Bryant | |
| 2004/0045013 A1 | 3/2004 | Lam | |
| 2004/0064503 A1 | 4/2004 | Karakashian et al. | |
| 2004/0148569 A1 | 7/2004 | Sengodan | |
| 2004/0148570 A1 | 7/2004 | Sengodan | |
| 2004/0168153 A1 | 8/2004 | Marvin | |
| 2004/0172618 A1 | 9/2004 | Marvin | |
| 2004/0172638 A1 | 9/2004 | Larus et al. | |
| 2004/0177335 A1 | 9/2004 | Beisiegel et al. | |
| 2005/0154785 A1 | 7/2005 | Reed et al. | |
| 2005/0251527 A1 | 11/2005 | Phillips et al. | |
| 2006/0122958 A1 | 6/2006 | Beisiegel et al. | |
| 2006/0129560 A1 | 6/2006 | Adams et al. | |
| 2006/0150204 A1 | 7/2006 | Beisiegel et al. | |

OTHER PUBLICATIONS

Lublinerman et al, "Modularity vs Resuability code generation from synchronous block diagrams", ACM EDAA, pp. 1504-1509, 2008.*

Gutberlet et al, "Specification of interface components for synchronous data paths", IEEE, pp. 134-139, 1994.*

Vellis, "Model based development of synchronous collaborative user interface", ACM EICS, pp. 309-312, 2009.*

Brush et al, "A comparision of synchronous remote and local usability studies for an expert interface", ACM CHI, pp. 1179-1182, 2004.*

Brunvand et al, "Practical advances in asynchronous design and in asynchronous/synchronous interfaces", ACM DAC, pp. 1-6, 1999.*

Hatanu et al, "Analysis of remote execution models for grid middlewere", ACM MGC, pp. 1-6, 2006.*

Alur, D., J. Crupi, and D. Malks, "J2EE Platform Overview", [Internet], Oct. 5, 2001, [Retrieved on Dec. 11, 2004], Retrieved from the Internet at <URL: http://www.informit.com/articles/printerfriendly.asp?p=23573>.

Armstrong, E., J. Ball, S. Bodoff, D.B. Carson, I. Evans, D. Green, K. Haase, and E. Jendrock, "The J2EE 1.4 Tutorial", © 2004 Sun Microsystems, In.c., Aug. 30, 2004, Ch. 1-2, pp. 1-82.

Heiss, J.J., "JAX-RPC Brings Portability to Web Services", [online], [Retrieved on Nov. 23, 2004]. Retrieved from the Internet at <URL: http://java.sun.com/features/2003/01/jax_rpc.html>, 3 pp.

Horrell, S., "Introducing JAX-RPC: Build and Access Web Services Based on Synchronous RPC-Oriented SOAP Messaging", [online], © 2001-2004 Fawcette Technical Publications, [Retrieved on Nov. 23, 2004]. Retrieved from the Internet at <URL: http://www.fawcette.com/javapro/2002%5F05/magazine/features/shorrell/default_pf.aspx>, 9 pp.

Merrall, S. And A. Billig, "Dynamo: Dynamic Document Generation in Java", Proceedings of the First International Conference on the Practical Application of Java, 1999, pp. 73-89.

Piccinelli, G., W. Emmerich, and A. Finkelstein, "Mapping Service Components to EJB Business Objects", Proceedings of the Fifth IEEE International Enterprise Distributed Object Computing Conference, 2001, pp. 169-173.

Prohorenko, O., "Local and Remote EJB Interfaces", [online], Nov. 3, 2004, [Retrieved on Dec. 2, 2004]. Retrieved from teh Internet at <URL: http://www.onjava.com/lpt/a/5389>, 4 pp.

Sharma, R., "Java API for XML-based RPC (JAX-RPC): A Primer", [online], © 1994-2004 Sun Microsystems, [Retrieved on Nov. 23, 2004]. Retrieved from the Internet at <URL: http://java.sun.com/xml/jaxrpc/primerarticle.html>, 3 pp.

Sun Microsystems, Inc., "J2EE Connector Architecture", White Paper, [online], [Retrieved on Nov. 23, 2004]. Retrieved from the Internet at <URL: http://java.sun.com/j2ee/white/connector.html>, 6 pp.

Sun Microsystems, "Java Platform 1.2 API Specification: Interface RemoteRef", [online], [Retrieved on Nov. 8, 2009]. Retrieved from the Internet at <URL: http://www.inf.puc-rio.br/~roberto/java/jdkl.2/docs/api/java/rmi/server/RemoteRef.html>, 1993-1998, Sun Microsystems, pp. 1-6.

U.S. Statutory Invention Registration for H,001,921, published Nov. 7, 2000 by Fletcher et al., 34 pp.

* cited by examiner

For each method with arguments, return, and exceptions:

```
<interface-name>Async.java                                              40

Ticket <methodName>Async(ArgT1 arg1, ... ArgTn argn)
                                                                        41
    retT <methodName>Response(Ticket ticket, long timeout)              42

Ticket <methodName>Async(ArgT1 arg1, ... ArgTn argn, <interface-name>Callback
    callback)                                                           43

<interface-name>Callback.java                                           44 void on<methodName>Response(Ticket ticket, retT ret, Exception exception)
                                                                        45

<interface-name>ImplAsync.java                                          46 void <methodName>Async(ArgT1 arg1, ... ArgTn argn, <interface-name>
    Callback callback)                                                  47
```

FIG. 4

For each method with arguments, no return, and exceptions:

```
<interface-name>Async.java                                              50

Ticket <methodName>Async(ArgT1 arg1, ... ArgTn argn)                51 void <methodName>Response(Ticket ticket, long timeout) -- throws ET1...ETn
                                                                        52
    Ticket <methodName>Async(ArgT1 arg1, ... ArgTn argn, <interface-
    name>Callback callback)                                             53

<interface-name>Callback.java                                           54 void on<methodName>Response(Ticket ticket, Exception exception)
                                                                        55

<interface-name>ImplAsync.java                                          56 void <methodName>Async(ArgT1 arg1, ... ArgTn argn, <interface-name>
    Callback callback, Ticket ticket)                                   57
```

FIG. 5

For each method with arguments, return, and no exceptions:

<interface-name>Async.java — 60

Ticket <methodName>Async(ArgT1 arg1, ... ArgTn argn) — 61 retT  <methodName>Response(Ticket ticket, long timeout) — 62

Ticket <methodName>Async(ArgT1 arg1, ... ArgTn argn, <interface-name>Callback callback) — 63

<interface-name>Callback.java — 64 void on<methodName>Response(Ticket ticket, retT ret, Exception exception) — 65

<interface-name>ImplAsync.java — 66 void <methodName>Async(ArgT1 arg1, ... ArgTn argn, <interface-name>Callback callback, Ticket ticket) — 67

FIG. 6

For each method with arguments, no return, and no exceptions:

<interface-name>Async.java — 80 void <methodName>Async(ArgT1 arg1, ... ArgTn argn) — 81

<interface-name>ImplAsync.java — 82 void <methodName>Async(ArgT1 arg1, ... ArgTn argn) — 83

GENERATING ASYNCHRONOUS INTERFACES AND METHODS FROM SYNCHRONOUS INTERFACES AND METHODS

BACKGROUND OF THE INVENTION

1. Field of the Invention

The present invention relates to a method, system, and program for generating asynchronous interfaces and methods from synchronous interfaces and methods.

2. Description of the Related Art

Software developers may create application services that expose a set of interfaces to other applications to invoke. For instance, an Enterprise Java Bean (EJB)™ is a collection of Java™ classes following defined rules and providing specific methods, and an XML file, combined into one single unit. (Java and Enterprise Java Beans are trademarks of Sun Microsystems, Inc.) Session beans model business services and expose EJB remote interfaces, which a client component will use to invoke the services, i.e., interfaces, on a target component implementing the services. The component interfaces exposed to the client component may implement synchronous methods, which require the client application wait for a response from the service. Additionally, an exposed service interface may also provide for asynchronous communication with the client application through the use of message driven beans (MDB) to implement asynchronous access to a session ban.

SUMMARY

Provided are a method, system, and program for generating asynchronous interfaces and methods from synchronous interfaces and methods receiving a synchronous interface to a target component having a synchronous method used by a client component to synchronously invoke the target component. An asynchronous interface is generated for the synchronous interface of the target component. An asynchronous method is generated for the generated asynchronous interface having arguments to invoke the target component, wherein the client calls the generated asynchronous method to cause an asynchronous execution of the synchronous method.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
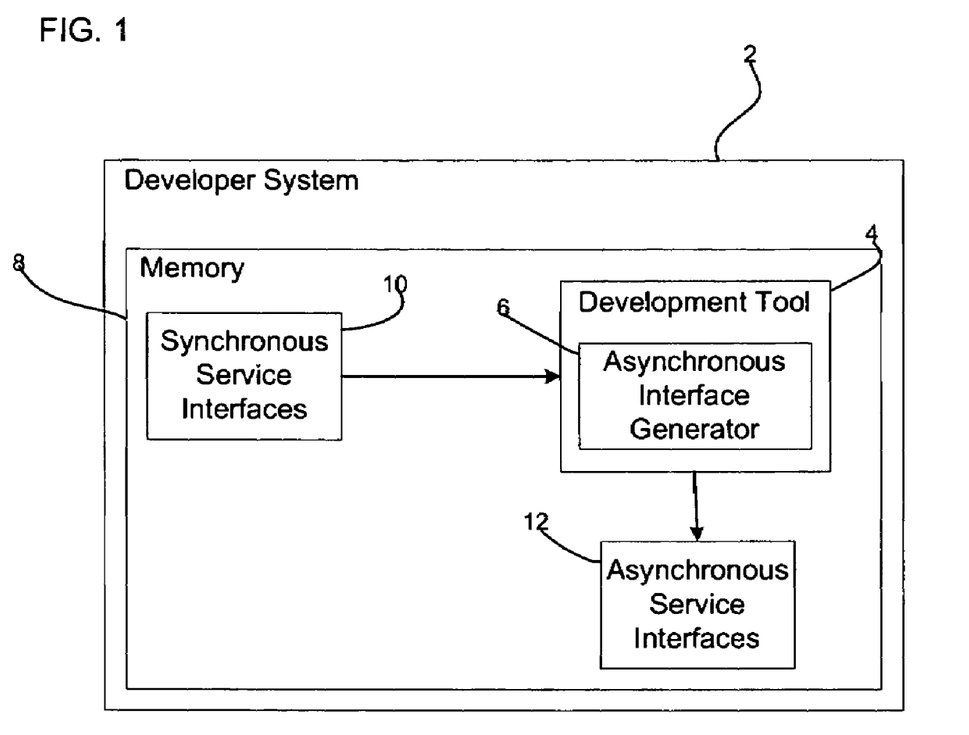
FIG 1. 1 illustrates an embodiment of a developer system.

FIG. 1 illustrates a development system having a development tool 4 including an asynchronous interface generator 6 to automatically generate asynchronous interfaces and their methods from synchronous interfaces and methods for a target component. The development tool 4 executes in the system memory 8 and receives synchronous service interfaces 10 to a target component being developed. The target component maybe called by a remote or local client. A local call means that the client and target components are in the same module. A remote call is a call from another module which may execute in another runtime environment even on a different machine. The asynchronous interface generator 6 generates a set of asynchronous target component interfaces 12 to enable a client application and the target component to interact in an asynchronous manner even if the target component implements synchronous interfaces.

Figure 2:
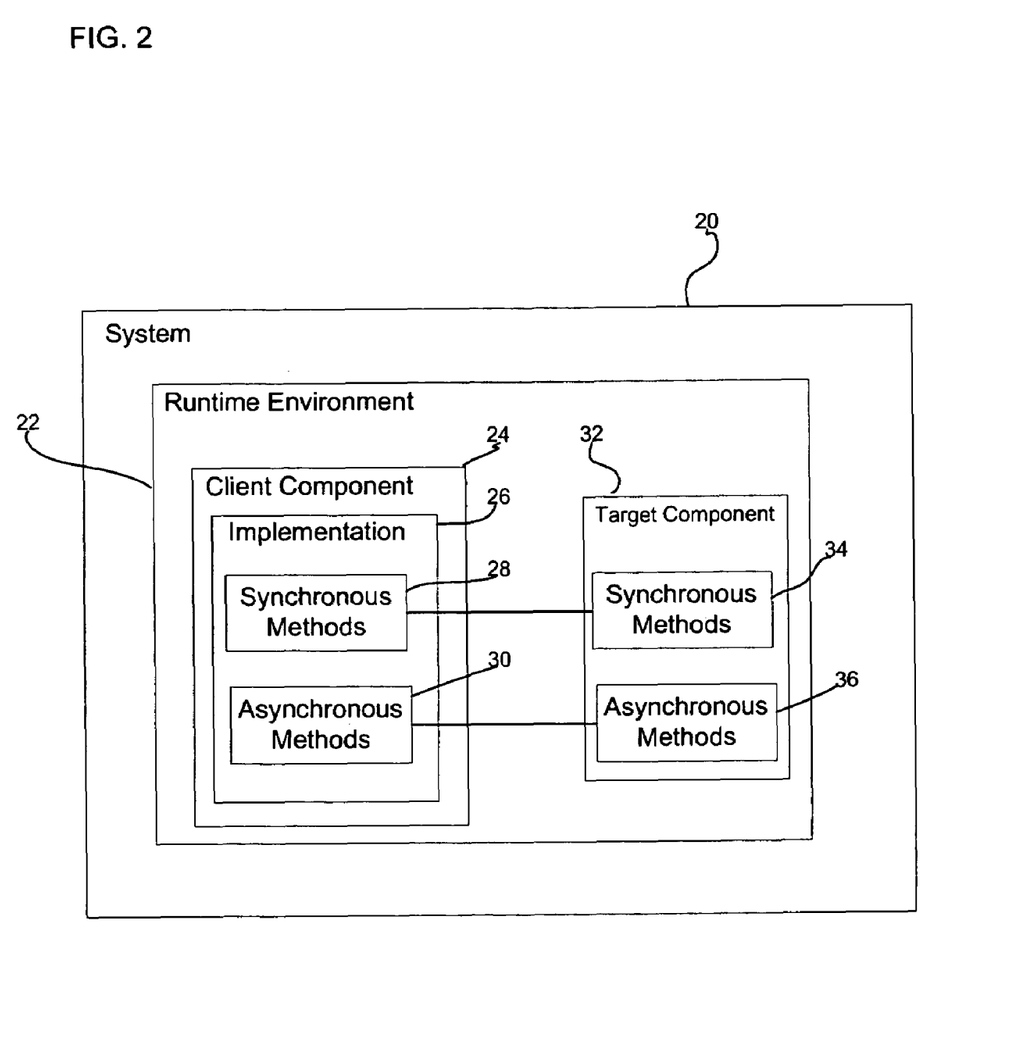
FIG. 2 illustrates an embodiment of a system in which generated interfaces execute in a runtime environment.

FIG. 2 illustrates an embodiment of a system 20 in which the generated interfaces execute in a runtime environment 22. The runtime environment 22 includes a client component 24 including an implementation 26, and the implementation 26 may invoke either the synchronous methods 28 or the corresponding asynchronous methods 30 to communicate with the target component 32. The target component 32 implements either synchronous 34 or asynchronous 36 methods, and independent of that the client component 24 can either choose to use the synchronous 28 or asynchronous 30 methods for invocation. The runtime environment 22 ensures proper handling of the asynchronous calls. Thus, if the client component 24 makes an asynchronous call, but the target component 32 is implements the method as a synchronous operation, the runtime environment 22 ensures that the necessary operations and conversions happen to translate the target component 32 synchronous call into an asynchronous operation for the client component 24. The client component 24 and target component 32 independently implement asynchronous or synchronous interfaces, and the runtime environment 22 ensures that an asynchronous call in the client component 24 is handles asynchronously regardless of whether the target component 32 does in fact implement the called method asynchronously.

Figure 3:
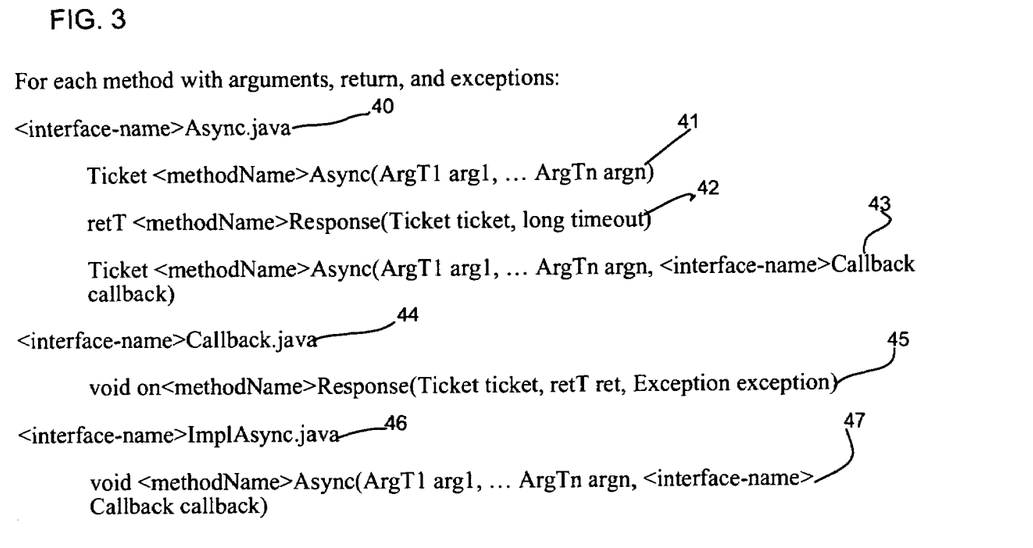
FIGS. 3, 4, 5, and 6 illustrates an embodiment of how asynchronous methods may be generated from a synchronous interface and methods.
Figure 4:
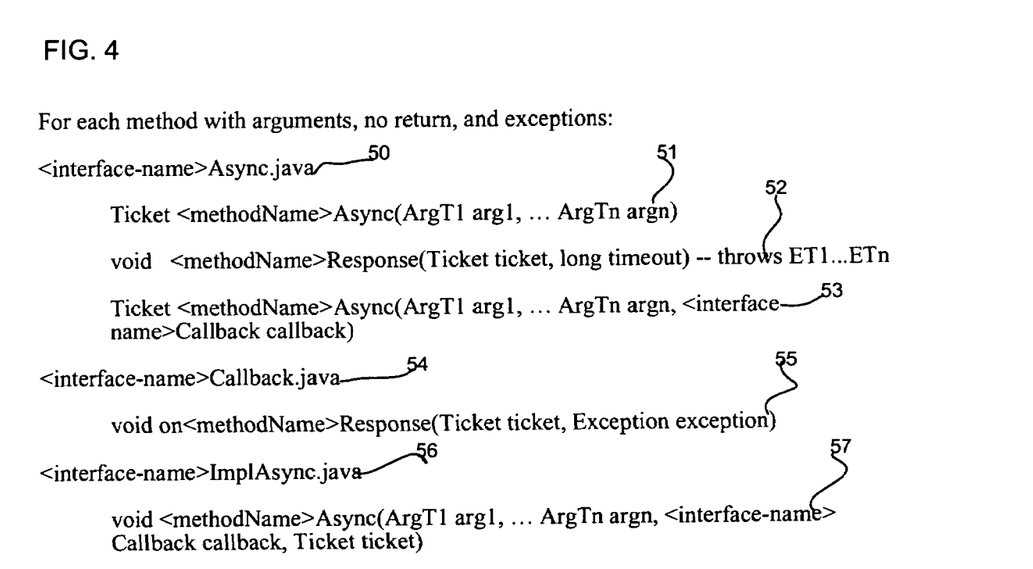
Figure 5:
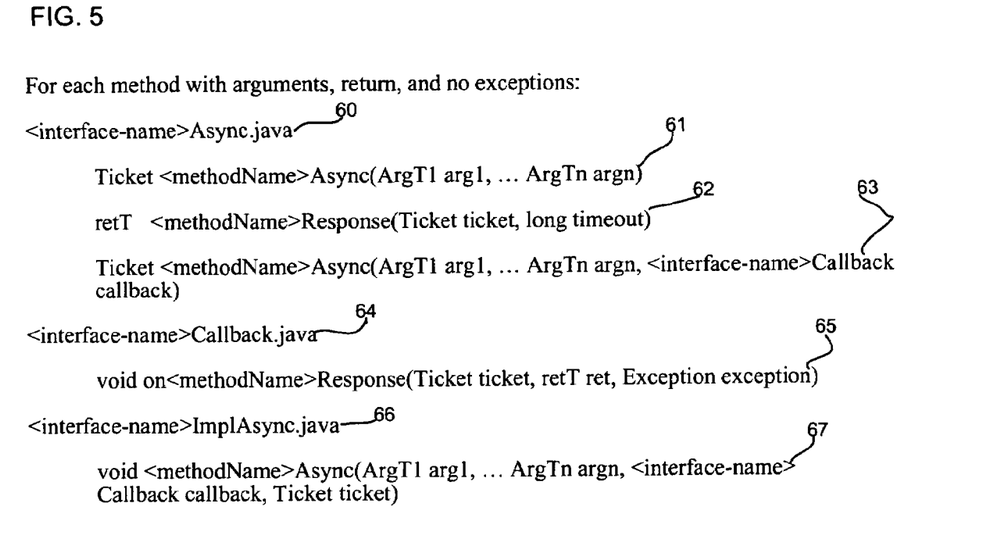

FIGS. 3, 4, 5, and 6 illustrate rules and examples for how the asynchronous interfaces are generated by the asynchronous interface generator 6. FIG. 5 illustrates the rules for generating asynchronous methods and interfaces when the method provides for arguments, returns and exceptions. The synchronous method name, referred to as <method name> is used in generating the name of the asynchronous method. The first asynchronous interface 40 includes methods 41 and 42 for the deferred response, where the asynchronous method 41 returns the ticket which is used as input to 42. The generated asynchronous methods 41, 42, and 43 have the names of the synchronous methods, with different suffixes. The Ticket is an externalizable object that can be used across threads and processes. The client implementation 26 calls the response method 42 to retrieve the return data as part of a deferred response. The second asynchronous method 43, also part of the first asynchronous interface 40, includes a callback argument, such that the service that implements the callback interface 44 is passed as the callback argument. The callback method 43 returns the ticket, which then can be used for correlation once the callback arrives. The callback interface 44 includes a void response method 45 that is called by the runtime environment 22 to pass the returned data to the callback service passed in the callback method 43. The asynchronous interface 46 includes one void asynchronous method 47 that the client implementation 26 calls to invoke the method of the target component 32, which the target component 32 may implement asynchronously.

FIG. 4 provides an embodiment of the asynchronous methods and interfaces generated when the synchronous method has arguments, no returns, and exceptions. The interfaces and methods generated for the situation of FIG. 4 are similar to those generated with respect to FIG. 3, where the method has arguments, returns, and exceptions, with the difference that the response methods 52 and 55 are void methods not returning any data. This is the same as the implementation for FIG. 3, except that the callback of void methods 53 and 57 only permit the passing of exceptions back to the callback service. The third asynchronous method 57 is generated for the "no return" scenario, where there is no return from the second asynchronous method 52 of the deferred response, and no return is passed as the input argument to 55; 57.

FIG. 5 provides an embodiment of the asynchronous methods and interfaces generated when the synchronous method has arguments, returns, and no exceptions. The interfaces and methods generated for the situation of FIG. 5 are similar to those generated with respect to FIG. 3 where the synchronous method has arguments, returns, and exceptions, with the difference that the methods 62 and 65 only provide for runtime 22 exceptions.

Figure 6:
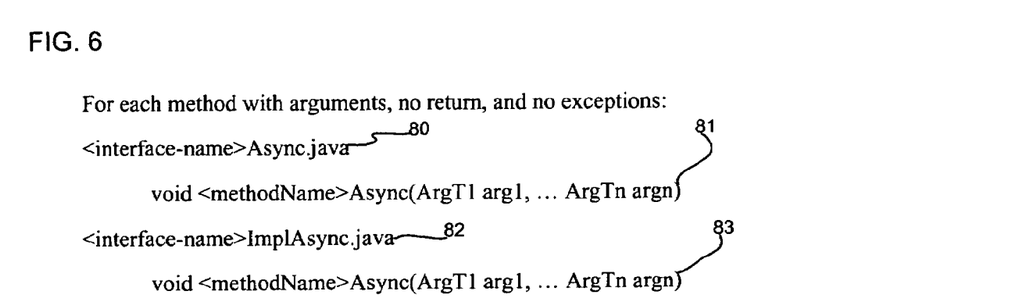

FIG. 6 provides an embodiment of the asynchronous methods generated when the synchronous method has arguments, but no returns and no exceptions. For this rule, only two asynchronous methods 81 and 83 are generated one for a generated asynchronous method and interface and another for synchronous operations.

In the embodiments of FIGS. 3-7, the generated asynchronous interface and methods have the same interface names plus method names to reuse the synchronous names and have added suffixes specific to the asynchronous operations. The rules of FIGS. 3-7 are applied to each method in the synchronous interface to produce the asynchronous interfaces. Further, the asynchronous interface generator 6 generates the interfaces of the methods defined in the interface. The generated interfaces for the asynchronous methods, e.g., 41, 43, 47 (FIG. 3), executed by the target component 32 in response to invocation by the client implementation 26, performs the same functional operations as the synchronous method except that the interaction between the client 24 target 32 components is asynchronous.

Figure 7:
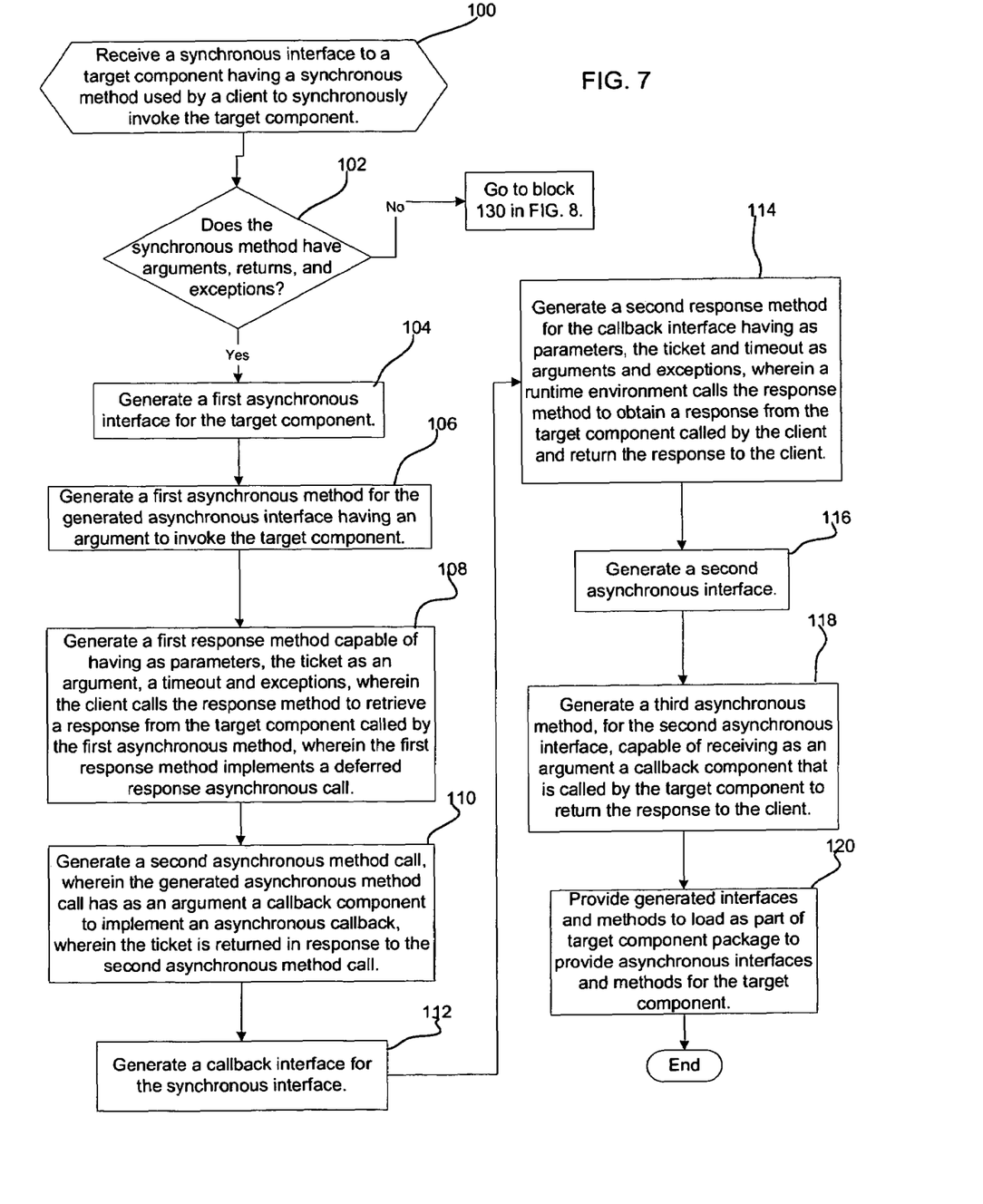
FIGS. 7 and 8 illustrate embodiments of embodiments of operations to generate asynchronous methods and interfaces from synchronous interfaces and method.
Figure 8:
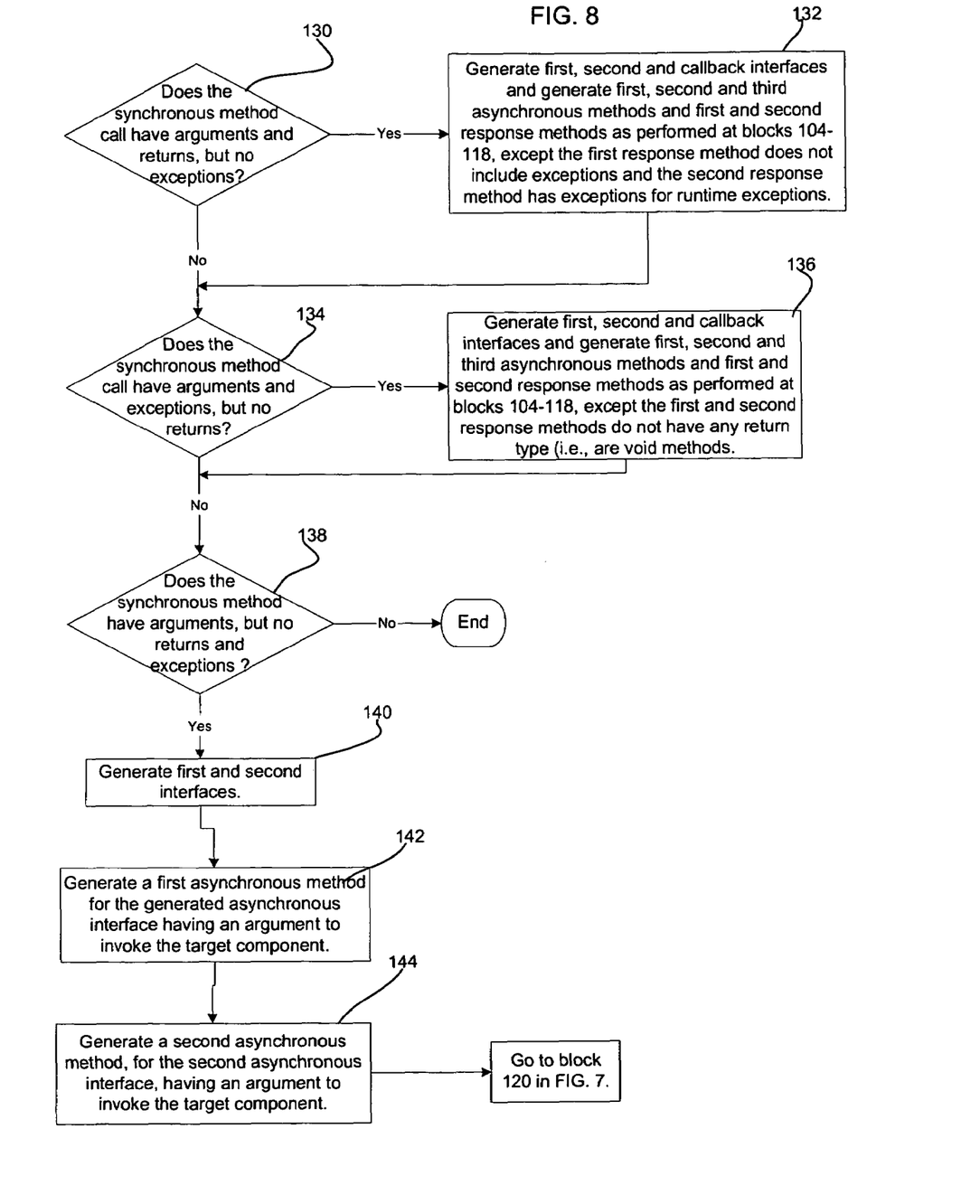

FIGS. 7 and 8 illustrate operations performed by the asynchronous interface generator 6 to generate asynchronous interfaces and methods from synchronous interfaces and methods to provide an asynchronous interaction model for clients to interact with a target component 32. This allows for the target component 32 to be implemented either synchronously or asynchronously, and the client component 24 can select the interaction model (synchronous or asynchronous) to use for the calls. Control begins upon the asynchronous interface generator 6 receiving (at block 100) a synchronous interface 10 to a target component 10 having a synchronous method used by the client implementation 26 to synchronously invoke the target component 32. If (at block 102) the synchronous method has arguments, returns, and exceptions, then a first asynchronous interface, e.g., 40 (FIG. 3) is generated (at block 104) for the target component 32. A first asynchronous method, e.g., 41, is generated (at block 106) for the generated asynchronous interface 40 that passes the same arguments as input that are defined on the synchronous method having an argument to invoke the target component. As part of generating the first asynchronous interface 40 or any other method, the asynchronous interface generator 6 further generates the code for the generated asynchronous interface for the target component 32, where the generated code performs the same operations as the synchronous method, except for how the method interacts with the client to return data. The asynchronous interface generator 6 further generates (at block 108) a first response method 42 capable of having as arguments a ticket and a timeout and exceptions as defined on the synchronous method. The client implementation 26 calls the response method 42 to retrieve a response from the target component called by the first asynchronous method 41. The first asynchronous method 41 and the first response method 42 implement a deferred response asynchronous call.

For a deferred response asynchronous method, the client implementation 26 calls the first asynchronous method 41 on a target component, which returns data. The implementation 26 further calls the generated first response method 42 to retrieve the requested data to return. The call to the first response method 42 includes a ticket returned in response to calling the first asynchronous method and a timeout to allow for a timeout if the target component 32 does not return the data after the requested timeout period. The implementation 26 and target component 32 use the ticket to identify the call and any return data the target component 32 generates while executing the called method. For the case that the target component 32 is implemented synchronously, the runtime environment 22 manages the ticket and its association with the return data.

To implement an asynchronous callback, method, the asynchronous interface generator 6 generates (at block 110) a second asynchronous method call 43 (FIG. 3). The generated asynchronous method 43 takes arguments to process which are the arguments defined on the synchronous method. The second argument comprises the callback component which should receive the callback and that implements the callback interface explained below. A ticket is returned in response to the call to the second asynchronous method call 43, as part of the callback interaction style. The asynchronous interface generator 6 also generates (at block 112) a callback interface 44 for the synchronous interface and generates (at block 114) a second response method 45 for the callback interface 44 having as arguments, the return of the original synchronous method, the ticket, and exceptions of the method defined in the synchronous interface. The target component 32 executes the operation of the second asynchronous call 43, when the target implements the asynchronous interface 46 and method 47; otherwise the runtime 22 calls the target synchronously, and issues the callback passing the return of the target. The callback invokes the runtime environment 22 calls the second response method 45, implemented by the callback component 32, to pass the return data from the target component 32 as an input argument to the client component 24, which may comprise the callback component. In one embodiment, the client component 24 is the service that is called-back by the generated callback interface 44. In another embodiment, another service could be called back, depending on what is passed as the callback service for method 43

The asynchronous interface generator 6 further generates (at block 116) a second asynchronous interface 46 (FIG. 3) and generates (at block 118) a third asynchronous method 47, for the second asynchronous interface 46, capable of receiving as an argument a service implementing the callback interface 43. The second asynchronous interface 46 and third method 47 are generated if the target component 32 implementation is itself asynchronous. In such case, the target component 32 itself handles the callback and returns the data to the client component 24. Even though that the target may handle the callback and return data, the runtime environment 22 still interfaces between the client 24 and target 32 components, except that if the target component 32 is asynchronous, then the runtime environment 22 is less involved in the interaction, whereas if the target component 34 invoked is synchronous, then the runtime environment 22 handles the callback and returning the data. The generated synchronous interfaces and methods are included in the target component package of the development tool 4 and loaded to provide asynchronous interfaces and methods for the target component.

From the no branch of block 102, if (at block 130 in FIG. 8) the synchronous method provides for arguments and returns, but no exceptions, then the asynchronous interface generator 6 generates (at block 132) a first 60, second 66, and callback interfaces 64 (FIG. 5) and further generates first 61, second 63 and third 67 asynchronous methods and first 62 and second 65 response methods as performed at blocks 104-118. One difference is that the first response method 62 does not include exceptions and the second response method 65 has exceptions for runtime exceptions. As discussed, when generating the methods and interfaces, the target component 32 may implement the methods and interfaces synchronously and/or asynchronously, which is independent of the methods and interfaces, either synchronous or asynchronous, the client component 24 calls to invoke the operations of the called method. The asynchronous methods have the same input arguments and returns to perform the same operations as the synchronous method but transmit as an asynchronous method to enable the interface between the implementation 26 and target component 32 transmit the return via the deferred response or callback asynchronous methods.

From the no branch of block 130, if (at block 134) the synchronous method provides for arguments and exceptions, but no returns, then the asynchronous interface generator 6 generates (at block 136) a first 50, callback 54, and second 56 interfaces (FIG. 4) and generates first 51, second 53 and third 57 asynchronous methods and first 52 and second 55 response methods as performed at blocks 104-118, except that the first 52 and second 55 response methods do not have a return input argument (i.e., are void methods). They would just return that the processing is complete. As discussed, when generating the methods, the implementation for the methods is implemented by the target component 32 either synchronously and/or asynchronously, and the user may use either synchronous or the generated asynchronous methods to invoke the target component 32 implementation, which may be synchronous or asynchronous.

If (at block 138) the synchronous method have arguments, but no returns and no exceptions, then the asynchronous interface generator 6 generates (at block 140) a first asynchronous interface 80 (FIG. 6) if the target component 32 does not implement an asynchronous interface for the called service and a second asynchronous interface 82 if the target component 32 provides an asynchronous interface. The asynchronous interface generator 6 further generates (at block 142) a first asynchronous method 81 for the client component 24 and generates (at block 144) a second asynchronous method 83, for the second asynchronous interface, that is implemented by the target component 34 if the target implements the method asynchronously. There are no returns or exceptions provided for the generated methods 81, 83. After generating the methods 81, 83 for the case where the synchronous target component interface does not have returns and exceptions, control proceeds to block 120 in FIG. 7.

The operations of FIGS. 7 and 8 may be performed for every method included in each synchronous service interface 10 to translate to an asynchronous 12 service interface. Further, for one synchronous interface named <interface-name>.java, the asynchronous interface generator generates one <interface-name>Async.java, one <interface-name>Callback.java, and one <interface-name>ImplAsync.java. Thus, the synchronous interface has methods in the variations described above which get translated accordingly into the methods in the asynchronous interfaces.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiment, the translation of synchronous interface and methods to asynchronous interfaces and methods was performed by the asynchronous interface generator 6. In alternative embodiments, different components may perform the operation of the asynchronous interface generator 6. Still further, the operations of FIGS. 3 and 4 may be performed manually by the developer.

The illustrated operations of FIGS. 7 and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method implemented in a computer system, comprising:

receiving, by the computer system, a synchronous interface to a target component having a synchronous method used by a client component to synchronously invoke the target component;

generating, by the computer system, an asynchronous interface for the synchronous interface of the target component; and generating, by the computer system, an asynchronous method for the generated asynchronous interface having arguments to invoke the target component, wherein the client calls the generated asynchronous method to cause an asynchronous execution of operations of the synchronous method and to enable the client component and the target component to interact in an asynchronous manner.

2. The method of claim 1, wherein generating the asynchronous method comprises generating a method to asynchronously pass a service implementing a callback interface and generating a method that is called to pass return data to the client component.

3. The method of claim 1, wherein the generated asynchronous interface includes a name of the synchronous interface and has added suffixes, wherein a name of the asynchronous method includes a name of the synchronous method and a suffix specific to the asynchronous operation.

4. The method of claim 1, wherein the generated asynchronous method returns a ticket to the client, wherein the ticket provides a reference for the call, wherein the generated asynchronous method has an argument comprising a service implementing a callback method providing an asynchronous callback at the target component, further comprising:

generating a callback interface for the synchronous interface; and generating a response method for the callback interface receiving the ticket as an argument, wherein a runtime environment calls the response method to obtain the return from the target component to provide to the client.

5. The method of claim 4, further comprising:

determining whether the synchronous method has at least one argument, at least one return, and at least one exception, wherein the return obtained by the response method comprises data returned to the client by the target component in response to determining that the synchronous method call provides at least one return, wherein the exception provided by the response method includes an exception defined for the asynchronous method in response to determining that the synchronous method call has at least one exception, and wherein the exception provided by the response method includes a runtime exception in response to determining that the synchronous method call has does not have one exception.

6. The method of claim 1, wherein a ticket is returned in response to the asynchronous method call, wherein the ticket provides a reference for the asynchronous method call, further comprising:

generating an asynchronous response method having the ticket as an argument, wherein the client calls the response method to retrieve a response from the target component called by the asynchronous method, wherein the response method implements a deferred response asynchronous call.

7. The method of claim 6, further comprising:

determining whether the synchronous method has at least one argument, at least one return, and/or at least one exception, wherein the return obtained by the response method comprises data returned to the client by the target component in response to determining that the synchronous method call provides at least one return and/or an exception in response to determining that the synchronous method call has at least one exception.

8. The method of claim 6, wherein the generated asynchronous response method is capable of having a timeout argument to cause the response method to timeout after a period specified in the timeout argument if no response is available.

9. The method of claim 1, wherein the target component additionally implements an asynchronous interface, wherein a ticket is returned in response to the asynchronous method call, wherein the ticket provides a reference for the call, wherein the generated asynchronous method call is enabled to receive as an argument a callback method, wherein the target component calls the callback method to transmit the return to the client.

10. The method of claim 1, wherein the generated asynchronous method comprises a first asynchronous method, wherein a ticket is returned in response to the target component executing the first asynchronous method, wherein the ticket provides a reference for the first asynchronous method call, further comprising:

generating a first response method having the ticket as an argument, wherein the client calls the response method to retrieve a return from the target component called by the first asynchronous method, wherein the first response method implements a deferred response asynchronous call;

generating a second asynchronous method, wherein the generated asynchronous method has as an argument a service implementing a callback interface, wherein the ticket is returned in response to the second asynchronous method call;

generating a callback interface for the synchronous interface; and generating a second response method for the callback interface having the ticket as an argument, wherein a runtime environment calls the response method to obtain a response from the target component called by the client and return the response to the client.

11. The method of claim 10, wherein the generated asynchronous interface comprises a first asynchronous interface, further comprising:

generating a second asynchronous interface; and generating a third asynchronous method for the second asynchronous interface, having a callback component passed as an argument to the target component, wherein the target component implements the method as an asynchronous method and uses the callback component to return results.

12. The method of claim 11, wherein the asynchronous interface comprises a first asynchronous interface, further comprising:

generating a callback interface including the second asynchronous method call; and generating a second asynchronous interface including the generated third asynchronous method call.

13. The method of claim 1, wherein the operations of receiving the synchronous interface, generating the asynchronous interface, and generating the asynchronous method are performed by an asynchronous interface generator provided with a software development tool.

14. A system for use in the development of a client component and a target component, comprising:
a processor;
a computer readable storage medium having code that is executed by the processor to perform operations, the operations comprising:
receiving a synchronous interface to the target component having a synchronous method used by a client component to synchronously invoke the target component;
generating an asynchronous interface for the synchronous interface of the target component; and
generating an asynchronous method for the generated asynchronous interface having arguments to invoke the target component, wherein the client calls the generated asynchronous method to cause an asynchronous execution of operations of the synchronous method and to enable the client component and the target component to interact in an asynchronous manner.

15. The system of claim 14, wherein generating the asynchronous method comprises generating a method to asynchronously pass a service implementing a callback interface and generating a method that is called to pass return data to the client component.

16. The system of claim 14, wherein the generated asynchronous interface includes a name of the synchronous interface and has added suffixes, wherein a name of the asynchronous method includes a name of the synchronous method and a suffix specific to the asynchronous operation.

17. The system of claim 14, wherein the generated asynchronous method returns a ticket to the client, wherein the ticket provides a reference for the call, wherein the generated asynchronous method has an argument comprising a service implementing a callback method providing an asynchronous callback at the target component, wherein the operations further comprise:
generating a callback interface for the synchronous interface; and
generating a response method for the callback interface receiving the ticket as an argument, wherein a runtime environment calls the response method to obtain the return from the target component to provide to the client.

18. The system of claim 14, wherein a ticket is returned in response to the asynchronous method call, wherein the ticket provides a reference for the asynchronous method call, wherein the operations further comprise:
generating an asynchronous response method having the ticket as an argument, wherein the client calls the response method to retrieve a response from the target component called by the asynchronous method, wherein the response method implements a deferred response asynchronous call.

19. An article of manufacture comprising a computer readable storage medium for use in the development of a client component and a target component, wherein the code in the computer readable storage medium is executed to cause operations, the operations comprising:
receiving a synchronous interface to a target component having a synchronous method used by a client component to synchronously invoke the target component;
generating an asynchronous interface for the synchronous interface of the target component; and
generating an asynchronous method for the generated asynchronous interface having arguments to invoke the target component, wherein the client calls the generated asynchronous method to cause an asynchronous execution of operations of the synchronous method and to enable the client component and the target component to interact in an asynchronous manner.

20. The article of manufacture of claim 19, wherein generating the asynchronous method comprises generating a method to asynchronously pass a service implementing a callback interface and generating a method that is called to pass return data to the client component.

21. The article of manufacture of claim 19, wherein the generated asynchronous interface includes a name of the synchronous interface and has added suffixes, wherein a name of the asynchronous method includes a name of the synchronous method and a suffix specific to the asynchronous operation.

22. The article of manufacture of claim 19, wherein the generated asynchronous method returns a ticket to the client, wherein the ticket provides a reference for the call, wherein the generated asynchronous method has an argument comprising a service implementing a callback method providing an asynchronous callback at the target component, wherein the operations further comprise:
generating a callback interface for the synchronous interface; and
generating a response method for the callback interface receiving the ticket as an argument, wherein a runtime environment calls the response method to obtain the return from the target component to provide to the client.

23. The article of manufacture of claim 19, wherein the operations further comprise:
determining whether the synchronous method has at least one argument, at least one return, and at least one exception, wherein the return obtained by the response method comprises data returned to the client by the target component in response to determining that the synchronous method call provides at least one return, wherein the exception provided by the response method includes an exception defined for the asynchronous method in response to determining that the synchronous method call has at least one exception, and wherein the exception provided by the response method includes a runtime exception in response to determining that the synchronous method call has does not have one exception.

24. The article of manufacture of claim 19, wherein a ticket is returned in response to the asynchronous method call, wherein the ticket provides a reference for the asynchronous method call, wherein the operations further comprise:
generating an asynchronous response method having the ticket as an argument, wherein the client calls the response method to retrieve a response from the target component called by the asynchronous method, wherein the response method implements a deferred response asynchronous call.

25. The article of manufacture of claim 24, wherein the operations further comprise:
determining whether the synchronous method has at least one argument, at least one return, and/or at least one exception, wherein the return obtained by the response method comprises data returned to the client by the target component in response to determining that the synchronous method call provides at least one return and/or an exception in response to determining that the synchronous method call has at least one exception.

26. The article of manufacture of claim 24, wherein the generated asynchronous response method is capable of having a timeout argument to cause the response method to timeout after a period specified in the timeout argument if no response is available.

27. The article of manufacture of claim 19, wherein the target component additionally implements an asynchronous interface, wherein a ticket is returned in response to the asynchronous method call, wherein the ticket provides a reference for the call, wherein the generated asynchronous method call is enabled to receive as an argument a callback method, wherein the target component calls the callback method to transmit the return to the client.

28. The article of manufacture of claim 19, wherein the generated asynchronous method comprises a first asynchronous method, wherein a ticket is returned in response to the target component executing the first asynchronous method, wherein the ticket provides a reference for the first asynchronous method call, wherein the operations further comprise:

generating a first response method having the ticket as an argument, wherein the client calls the response method to retrieve a return from the target component called by the first asynchronous method, wherein the first response method implements a deferred response asynchronous call;

generating a second asynchronous method, wherein the generated asynchronous method has as an argument a service implementing a callback interface, wherein the ticket is returned in response to the second asynchronous method call;

generating a callback interface for the synchronous interface; and generating a second response method for the callback interface having the ticket as an argument, wherein a runtime environment calls the response method to obtain a response from the target component called by the client and return the response to the client.

29. The article of manufacture of claim 28, wherein the generated asynchronous interface comprises a first asynchronous interface, wherein the operations further comprise:

generating a second asynchronous interface; and generating a third asynchronous method for the second asynchronous interface, having a callback component passed as an argument to the target component, wherein the target component implements the method as an asynchronous method and uses the callback component to return results.

30. The article of manufacture of claim 28, wherein the asynchronous interface comprises a first asynchronous interface, further comprising:

generating a callback interface including the second asynchronous method call; and generating a second asynchronous interface including the generated third asynchronous method call.

31. The article of manufacture of claim 19, wherein the operations of receiving the synchronous interface, generating the asynchronous interface, and generating the asynchronous method are performed by an asynchronous interface generator provided with a software development tool.

* * * * *